United States Patent [19]

Murphy et al.

[11] Patent Number: 5,173,682
[45] Date of Patent: Dec. 22, 1992

[54] LIT POINTER FOR AN ANALOG HUD IMAGE SOURCE

[75] Inventors: Morgan D. Murphy, Kokomo; Robert J. Myers, Russiaville, both of Ind.

[73] Assignee: Delco Electronics Corporation, Kokomo, Ind.

[21] Appl. No.: 630,621

[22] Filed: Dec. 20, 1990

[51] Int. Cl.⁵ ............................................. B60Q 1/00
[52] U.S. Cl. ..................................... 340/461; 116/288; 340/705; 362/26
[58] Field of Search .................... 340/980, 705, 461; 116/288, DIG. 6, DIG. 35, 290; 362/26, 30, 28, 80.1, 83.1; 359/630, 632

[56] References Cited

U.S. PATENT DOCUMENTS

| | | | |
|---|---|---|---|
| 3,033,155 | 5/1962 | Beckman | 116/288 |
| 3,317,906 | 5/1967 | Baldridge | 340/705 |
| 4,045,794 | 8/1977 | Ohta | 340/461 |
| 4,274,358 | 6/1981 | Nakamura et al. | 116/288 |
| 4,376,934 | 3/1983 | Prohaska et al. | 340/461 |
| 4,559,582 | 12/1985 | Scardilli et al. | 362/23 |
| 4,636,782 | 1/1987 | Nakamura et al. | 340/461 |
| 4,872,093 | 10/1989 | Shimizu | 362/26 |
| 4,959,759 | 9/1990 | Kohler | 362/80 |
| 5,053,755 | 10/1991 | Smith et al. | 340/980 |

FOREIGN PATENT DOCUMENTS

| | | |
|---|---|---|
| 3036963 | 3/1982 | Fed. Rep. of Germany . |
| 3300271 | 7/1984 | Fed. Rep. of Germany . |
| 3347014 | 7/1985 | Fed. Rep. of Germany . |
| 3626957 | 2/1988 | Fed. Rep. of Germany . |
| 3824391 | 1/1990 | Fed. Rep. of Germany . |

OTHER PUBLICATIONS

EP 0351259 A1, Rousseau (European Publication), Jan. 1990.
EP 0180726 B1, Friepes (European Publication), May 1986.
EP 0110063 B1, Endler et al (European Publication), Jun. 1984.

Primary Examiner—Jin F. Ng
Assistant Examiner—Brent A. Swarthout
Attorney, Agent, or Firm—Anthony Luke Simon

[57] ABSTRACT

A pointer receives light from a light source and reflects it out of the pointer tip providing a brightly lit pointer suitable for miniaturization and HUD image sources. The pointer has a first reflective surface for directing light from a source into a longitudinal portion of the pointer, and a second reflective surface, parallel to the first surface, for non-dispersively reflecting light out of a tip of the pointer.

8 Claims, 1 Drawing Sheet

LIT POINTER FOR AN ANALOG HUD IMAGE SOURCE

This invention relates to automotive head-up displays and more particularly to providing a lit pointer suitable for use in image sources for analog head-up displays.

BACKGROUND OF THE INVENTION

Head-up displays (HUDs) have long been used in airplanes to aid the pilots. The HUD reflects information the pilot needs off of a half mirror or the windshield and projects that information at a distance in front of the plane so that the pilot does not have to look into the cockpit to see the information.

More recently, HUDs have been used in automotive applications. In many of these automotive applications, the image is projected up and reflected off of the vehicle front windshield to appear at a distance in front of the driver. With a HUD in a vehicle, the driver does not have to adjust his eyes from the road to read information, such as vehicle speed, which is normally displayed in the vehicle instrument panel.

Various current automotive head-up displays project an image of digital information for the driver. However, many drivers prefer to view certain information such as vehicle speed and engine RPMs in analog form, e.g., a pointer and a scale. Furthermore, many vehicle operators prefer the pointer to be lit so that it emits light making it easily viewable and aesthetically appealing.

Previous designs for lighted pointers are not suitable for HUD image sources because they do not provide enough light for daytime viewing and because they are not suitable for miniaturization, as required to be used in the HUD image source.

SUMMARY OF THE PRESENT INVENTION

The present invention provides a lit pointer suitable for use in a HUD image source. The pointer has a shaft and an arm comprising a light conductive material. The shaft is connected to a gauge or other means for rotating the shaft. A light source supplies light to the pointer at the pointer shaft. The pointer shaft includes a first reflective surface with reflects the light from the light source along the arm of the pointer. The tip of the pointer includes a second reflective surface which reflects the light along the projection path of the HUD. Neither the first nor the second reflective surfaces disperses the light, maintaining the light at high intensity so the pointer can be viewed even during the brightest daylight hours.

DETAILED DESCRIPTION OF THE INVENTION

Figure 1:
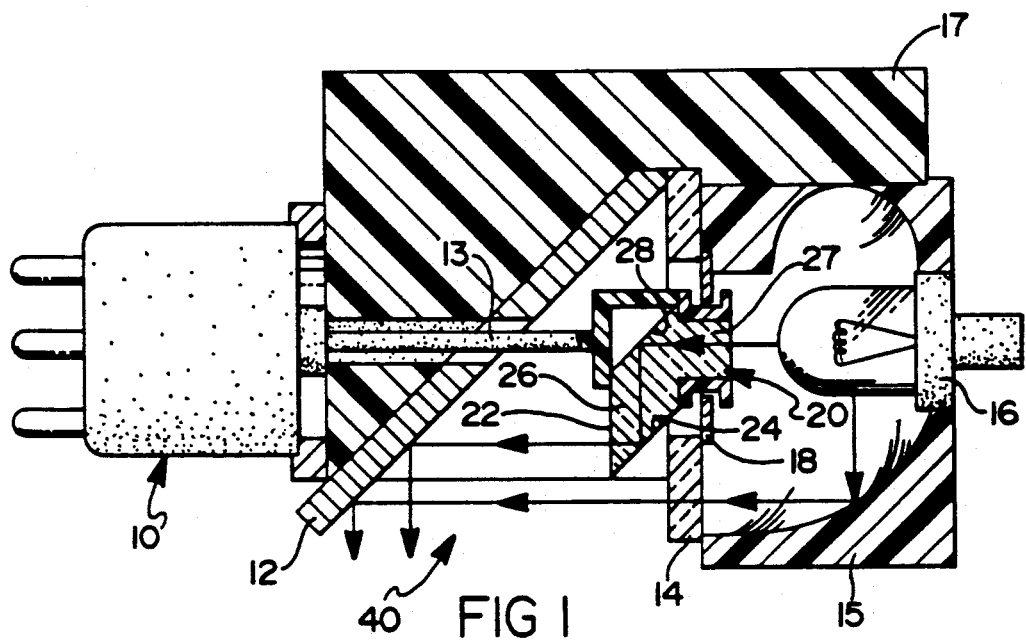
FIG. 1 is an illustration of the lit pointer used in an analog HUD image source.

Referring to FIG. 1, the image source for the HUD includes the gauge 10, housing 17, fold mirror 12, pointer 20, graphics plate 14, baffle 18, reflector 15 and light source 16. The light source 16, together with the reflector 15, provide light to the graphics plate 14 and the pointer 20. The graphics plate 14 is preferably made of translucent material with an opaque graphics pattern such that the graphics (e.g., speed scale, etc.) appear dark with a bright background. An image of the lighted graphics plate is reflected off of the fold mirror 12 and projected along the projection path 36 of the head-up display system (see FIG. 2).

Light from the light source also enters the pointer 20 at the light receptive portion 27 which is made of any light conductive material typically used in light piping. The light is reflected off of the surface 28 so that it travels in parallel rays along the pointer arm 26. The reflective surface 28 is made by molding or grinding, into the pointer arm 26, a surface substantially 45 degrees to the pointer shaft 13 and 45 degrees to the pointer arm 26. Preferably, no reflective coating is placed on the surface 28 because the surface reflects light efficiently without any such coating, and some coatings actually tend to disperse the light.

The light reflected off of surface 28 is not dispersed and travels along the pointer arm 26 until it is reflected off of the second reflecting surface 24. The second reflective surface 24 is substantially parallel to the first reflective surface 28 and reflects the light, without dispersing it, out of the pointer tip 22. The light out of the pointer tip is reflected off of the fold mirror 12 and projected as a HUD image.

The pointer has a shaft 13 which is connected to the gauge 10 and the pointer moves when the gauge 10 rotates the shaft 13. The baffle 18 prevents light leakage around the pointer giving the pointer high contrast.

Figure 2:
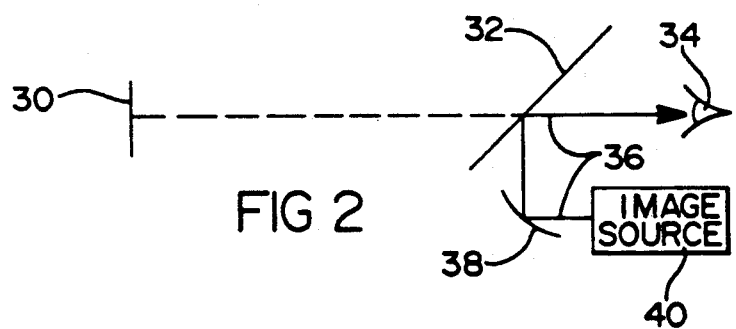
FIG. 2 is an illustration including the image source in a typical HUD system.

Referring to FIG. 2, the image source 40 projects an image along the projection path 36. The light rays are reflected off of mirror 38 (which may be aspherical to compensate for distortion caused from windshield 32) and windshield 32, and a magnified virtual image 30 of the image source appears at a distance in front of the vehicle operator's eye 34. The image of the pointer appears as a bar of light which moves back and forth along the scale as the vehicle speed, or whichever information is being displayed, changes. A color filter (not shown) may be placed over the light receiving portion 27 (FIG. 1) to change the color of the pointer light. A red filter is ideal because the color red is most visible during daylight hours. Those skilled in the art can easily implement the HUD projection system shown or another suitable HUD projection system.

Most HUD projection systems magnify the image several times so that the image appears larger than the image source. Because of this, the image source need not be large and is preferably miniaturized. The lit pointer image source described above is ideal for miniaturization.

Figure 3:
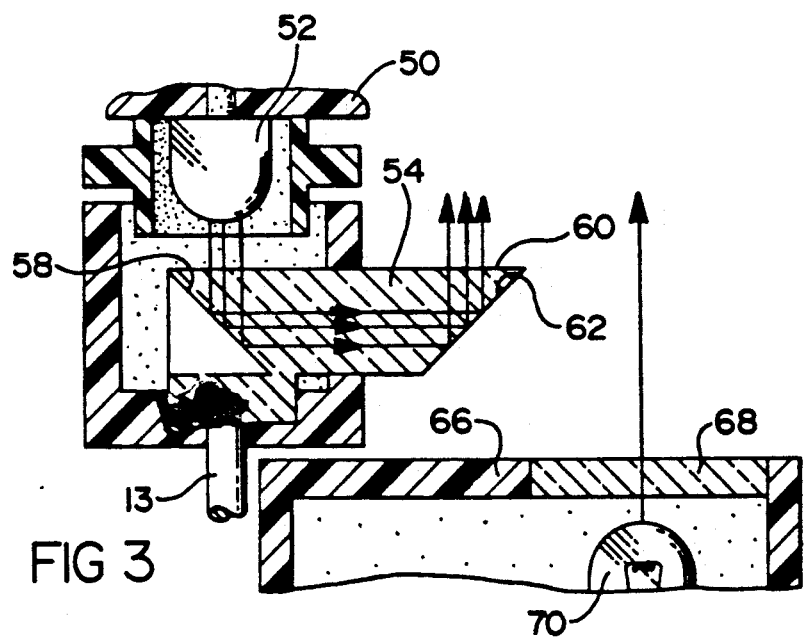
FIG. 3 is an illustration including a separate light-/source for the lit pointer.

The lighted pointer need not appear exactly as set forth above. For example, the pointer may be lit by a separate light source, such as LED 52 shown in FIG. 3, which shows a different construction for the HUD image source. The LED 52 is mounted to mount 50, which does not move. In an alternative implementation (not shown), the LED (or alternative light source) may be attached to the pointer so that it rotates with the pointer. In this case, the LED leads are connected to a power supply through torsion spring connectors allowing the LED to rotate with the pointer.

Referring again to FIG. 3, light from the LED 52 enters the pointer arm 54 and is reflected off of the first reflective surface 58, which is at 45 degrees to both the pointer arm and the axis of the pointer shaft 13. The light travels through the pointer arm, bounces off of the second reflective surface 62 and travels out of the pointer tip 60. The light source 70 provides light to the graphics plate 68 and baffle 66 prevents light leakage providing high contrast for the pointer.

Various other improvements and modifications to the present invention may occur to those skilled in the art and fall within the scope of the invention as set forth below.

The embodiments of the invention in which an exclusive property or privilege is claimed are defined as follows:

1. A lit pointer for an analog head-up display image source which creates an image projected along a projection path to be viewed by a viewer in a motor vehicle, comprising:

a pointer shaft with an axis and connected to means for rotating the shaft;

a pointer arm comprising a light conductive material and having a longitudinal section and a pointer tip, the pointer shaft connected to the pointer arm opposite the pointer tip;

first means for receiving light from a light source into the pointer arm substantially at the pointer shaft axis and nondispersively reflecting said light within the longitudinal section of the pointer arm, the first means including a first reflective surface; and second means, including a second reflective surface parallel to the first reflective surface, for nondispersively reflecting said light out of the pointer tip along the projection path whereby the pointer provides a bright light source for indication of parameter measurement along a scale when the shaft is rotated.

2. The apparatus in claim 1 wherein the means for rotating the shaft includes an air core gauge.

3. The apparatus in claim 1 wherein the light source is an LED.

4. The apparatus in claim 1 wherein the first and second reflective surfaces are not coated.

5. The apparatus set forth in claim 1, wherein the first reflective surface is at an angle substantially 45 degrees to the pointer shaft axis and 45 degrees to the longitudinal section of the pointer arm.

6. A lit pointer for an analog head-up display image source which creates an image projected along a projection path to be viewed by a viewer in a motor vehicle, comprising:

a pointer shaft with an axis and connected to means for rotating the shaft;

a pointer arm comprising a light conductive material and having a longitudinal section and a pointer tip, the pointer shaft connected to the pointer arm opposite the pointer tip;

first means, including a first reflective surface with an angle substantially 45 degrees to the pointer shaft axis and 45 degrees to the longitudinal section of the pointer arm, for receiving light from a light source into the pointer arm substantially at the pointer shaft axis and nondispersively reflecting said light within the longitudinal section of the pointer arm; and second means, including a second reflective surface at an angle substantially perpendicular to the first reflective surface, for nondispersively reflecting said light out of the pointer tip along the projection path whereby the pointer provides a bright light source for indication of a parameter measurement along a scale when the shaft is rotated.

7. The apparatus in claim 6 wherein the first and second reflective surfaces are not coated.

8. A lit pointer for an analog head-up display image source which creates an image projected along a projection path to be viewed by a viewer in a motor vehicle, comprising:

a pointer shaft with an axis and connected to means for rotating the shaft, including an air core gauge;

a pointer arm comprising a light conductive material and having a longitudinal section and a pointer tip, the pointer shaft connected to the pointer arm opposite the pointer tip;

means for receiving light from a light source into the pointer arm substantially at the pointer shaft axis and nondispersively reflecting said light within the longitudinal section of the pointer arm including a first reflective surface with an angle substantially 45 degrees to the pointer shaft axis and 45 degrees to the longitudinal section of the pointer arm; and means for nondispersively reflecting said light out of the pointer tip along the projection path including a second reflective surface parallel to the first reflective surface wherein the first and second reflective surfaces are not coated and whereby the pointer provides a bright light source for indication of parameter measurement along a scale as the pointer shaft is rotated.

* * * * *